(12) United States Patent
Loprieno et al.

(10) Patent No.: US 8,644,340 B2
(45) Date of Patent: Feb. 4, 2014

(54) MULTIPLEXING IN AN OPTICAL TRANSPORT NETWORK (OTN)

(75) Inventors: Gilberto Loprieno, Milan (IT); Davide Codella, Cermenate (IT); Federico Scandroglio, Cassano Magnago (IT)

(73) Assignee: Cisco Technology, Inc., San Jose, CA (US)

( * ) Notice: Subject to any disclaimer, the term of this patent is extended or adjusted under 35 U.S.C. 154(b) by 342 days.

(21) Appl. No.: 13/022,422

(22) Filed: Feb. 7, 2011

(65) Prior Publication Data

US 2012/0201535 A1 Aug. 9, 2012

(51) Int. Cl.
*H04J 3/00* (2006.01)

(52) U.S. Cl.
USPC ............ 370/473; 370/474; 370/476; 370/537

(58) Field of Classification Search
None
See application file for complete search history.

(56) References Cited

U.S. PATENT DOCUMENTS

| | | | |
|---|---|---|---|
| 7,742,502 B2 * | 6/2010 | Vissers et al. ................ | 370/473 |
| 2007/0076769 A1 | 4/2007 | Zou | |
| 2007/0104485 A1 | 5/2007 | Zhang | |
| 2007/0189336 A1 | 8/2007 | Zou | |
| 2007/0248121 A1 * | 10/2007 | Zou .............................. | 370/498 |
| 2010/0183301 A1 * | 7/2010 | Shin et al. ..................... | 398/45 |

OTHER PUBLICATIONS

"Recommendation ITU-T G.709/Y.1331, Interfaces for the Optical Transport Network (OTN)" *ITU-T*, Dec. 2009.
"Recommendation ITU-T G.709/Y.1331 (Dec. 2009), Interfaces for the Optical Transport Network (OTN)," Covering Note, *ITU*, May 4, 2010.

* cited by examiner

*Primary Examiner* — Alex Skripnikov
(74) *Attorney, Agent, or Firm* — Baker Botts L.L.P.

(57) ABSTRACT

In one embodiment, a method includes receiving a plurality of signals at a plurality of ports, each of the signals having a protocol type; mapping each of the signals to one or more time slots of one of a plurality of Low Order Optical Transport Network (OTN) containers; mapping the Low Order OTN containers to a High Order OTN container; mapping the High Order OTN container to a High Order OTN envelope for communication over an OTN; and, in connection with the mapping of the High Order OTN container to the High Order OTN envelope, for each of the signals, inserting into the High Order OTN envelope information identifying the port that the signal was received at, the protocol type of the signal, the Low Order OTN container that the signal was mapped to, and one or more of the time slots that the signal was mapped to.

24 Claims, 7 Drawing Sheets

| | 7 | 6 | 5 | 4 | 3 | 2 | 1 | 0 |
|---|---|---|---|---|---|---|---|---|
| 32 | \multicolumn{5}{c\|}{Port #} | NU | NU | NU |
| 33 | \multicolumn{8}{c\|}{Protocol Type} |
| 34 | \multicolumn{4}{c\|}{ODU #} | \multicolumn{4}{c\|}{Time Slot} |
| 35 | \multicolumn{8}{c\|}{CRC} |

300 — frame structure with bytes 32–63 containing repeated Port #, Protocol Type, ODU #/Time Slot, and CRC fields. Labels: 312 (ODU #), 304 (Port #), 308 (Protocol Type), 316 (Time Slot).

*FIG. 4A*

|   | 7 | 6 | 5 | 4 | 3 | 2 | 1 | 0 |
|---|---|---|---|---|---|---|---|---|
| 32 | Port # |||| ODU # ||||
| 33 | Time Slot |||| Protocol Type ||||
| 34 | Port # |||| ODU # ||||
| 35 | Time Slot |||| Protocol Type ||||
| 36 | Port # |||| ODU # ||||
| 37 | Time Slot |||| Protocol Type ||||
| 38 | Port # |||| ODU # ||||
| 39 | Time Slot |||| Protocol Type ||||
| 40 | Port # |||| ODU # ||||
| 41 | Time Slot |||| Protocol Type ||||
| 42 | Port # |||| ODU # ||||
| 43 | Time Slot |||| Protocol Type ||||
| 44 | Port # |||| ODU # ||||
| 45 | Time Slot |||| Protocol Type ||||
| 46 | Port # |||| ODU # ||||
| 47 | Time Slot |||| Protocol Type ||||
| 48 | Port # |||| ODU # ||||
| 49 | Time Slot |||| Protocol Type ||||
| 50 | Port # |||| ODU # ||||
| 51 | Time Slot |||| Protocol Type ||||
| 52 | Port # |||| ODU # ||||
| 53 | Time Slot |||| Protocol Type ||||
| 54 | Port # |||| ODU # ||||
| 55 | Time Slot |||| Protocol Type ||||
| 56 | Port # |||| ODU # ||||
| 57 | Time Slot |||| Protocol Type ||||
| 58 | Port # |||| ODU # ||||
| 59 | Time Slot |||| Protocol Type ||||
| 60 | Port # |||| ODU # ||||
| 61 | Time Slot |||| Protocol Type ||||
| 62 | Port # |||| ODU # ||||
| 63 | Time Slot |||| Protocol Type ||||

*FIG. 4B*

|    | 7 | 6 | 5 | 4 | 3 | 2 | 1 | 0 |   |   |   |   |         |
|----|---|---|---|---|---|---|---|---|---|---|---|---|---------|
| 32 | Time Slot   |   |   |   | Protocol Type |   |   |   |   |   |   |   | Port 0  |
| 33 | ODU #       |   |   |   | Prot Type     |   |   | P |   |   |   |   |         |
| 34 | Time Slot   |   |   |   | Protocol Type |   |   |   |   |   |   |   | Port 1  |
| 35 | ODU #       |   |   |   | Prot Type     |   |   | P |   |   |   |   |         |
| 36 | Time Slot   |   |   |   | Protocol Type |   |   |   |   |   |   |   | Port 2  |
| 37 | ODU #       |   |   |   | Prot Type     |   |   | P |   |   |   |   |         |
| 38 | Time Slot   |   |   |   | Protocol Type |   |   |   |   |   |   |   | Port 3  |
| 39 | ODU #       |   |   |   | Prot Type     |   |   | P |   |   |   |   |         |
| 40 | Time Slot   |   |   |   | Protocol Type |   |   |   |   |   |   |   | Port 4  |
| 41 | ODU #       |   |   |   | Prot Type     |   |   | P |   |   |   |   |         |
| 42 | Time Slot   |   |   |   | Protocol Type |   |   |   |   |   |   |   | Port 5  |
| 43 | ODU #       |   |   |   | Prot Type     |   |   | P |   |   |   |   |         |
| 44 | Time Slot   |   |   |   | Protocol Type |   |   |   |   |   |   |   | Port 6  |
| 45 | ODU #       |   |   |   | Prot Type     |   |   | P |   |   |   |   |         |
| 46 | Time Slot   |   |   |   | Protocol Type |   |   |   |   |   |   |   | Port 7  |
| 47 | ODU #       |   |   |   | Prot Type     |   |   | P |   |   |   |   |         |
| 48 | Time Slot   |   |   |   | Protocol Type |   |   |   |   |   |   |   | Port 8  |
| 49 | ODU #       |   |   |   | Prot Type     |   |   | P |   |   |   |   |         |
| 50 | Time Slot   |   |   |   | Protocol Type |   |   |   |   |   |   |   | Port 9  |
| 51 | ODU #       |   |   |   | Prot Type     |   |   | P |   |   |   |   |         |
| 52 | Time Slot   |   |   |   | Protocol Type |   |   |   |   |   |   |   | Port 10 |
| 53 | ODU #       |   |   |   | Part Type     |   |   | P |   |   |   |   |         |
| 54 | Time Slot   |   |   |   | Protocol Type |   |   |   |   |   |   |   | Port 11 |
| 55 | ODU #       |   |   |   | Prot Type     |   |   | P |   |   |   |   |         |
| 56 | Time Slot   |   |   |   | Protocol Type |   |   |   |   |   |   |   | Port 12 |
| 57 | ODU #       |   |   |   | Prot Type     |   |   | P |   |   |   |   |         |
| 58 | Time Slot   |   |   |   | Protocol Type |   |   |   |   |   |   |   | Port 13 |
| 59 | ODU #       |   |   |   | Prot Type     |   |   | P |   |   |   |   |         |
| 60 | Time Slot   |   |   |   | Protocol Type |   |   |   |   |   |   |   | Port 14 |
| 61 | ODU #       |   |   |   | Prot Type     |   |   | P |   |   |   |   |         |
| 62 | Time Slot   |   |   |   | Protocol Type |   |   |   |   |   |   |   | Port 15 |
| 63 | ODU #       |   |   |   | Prot Type     |   |   | P |   |   |   |   |         |
|    |   |   |   |   |   |   |   |   | P = Parity Bit |   |   |   |         |

MULTIPLEXING IN AN OPTICAL TRANSPORT NETWORK (OTN)

TECHNICAL FIELD

The present disclosure relates generally to optical transport networks (OTNs).

BACKGROUND

Multiplexing typically involves joining multiple signals together for communication over a network. However, in many cases, different signals may have different protocol types.

BRIEF DESCRIPTION OF THE DRAWINGS

FIGS. 4A-C illustrate example multiplexing tagging.

DESCRIPTION OF EXAMPLE EMBODIMENTS

Overview

In one embodiment, a method includes receiving a plurality of signals at a plurality of ports, each of the signals having a protocol type; mapping each of the signals to one or more time slots of one of a plurality of Low Order Optical Transport Network (OTN) containers; mapping the Low Order OTN containers to a High Order OTN container; mapping the High Order OTN container to a High Order OTN envelope for communication over an OTN; and, in connection with the mapping of the High Order OTN container to the High Order OTN envelope, for each of the signals, inserting into the High Order OTN envelope information identifying the port that the signal was received at, the protocol type of the signal, the Low Order OTN container that the signal was mapped to, and one or more of the time slots that the signal was mapped to.

Description

Particular embodiments relate to systems and methods for identification of each client traffic transported over an OTN, allowing more efficient multiplexing and demultiplexing. In particular embodiments, OTN can multiplex and transport different kinds of data traffic. Clients are first mapped into a low order container and then aggregated into an high order container. Timeslots, presented in OTN, provide containers for transporting different type of traffic. Particular embodiments provide a way to identify at the receiving site each client traffic without demultiplexing the low order containers. In one embodiment, a method includes:
- receiving a plurality of signals at a plurality of ports, each of the signals having a protocol type;
- mapping each of the signals to one or more time slots of one of a plurality of Low Order Optical Transport Network (OTN) containers;
- mapping the Low Order OTN containers to a High Order OTN container;
- mapping the High Order OTN container to a High Order OTN envelope for communication over an OTN;
- in connection with the mapping of the High Order OTN container to the High Order OTN envelope, for each of the signals, inserting into the High Order OTN envelope information identifying: the port that the signal was received at, the protocol type of the signal, the Low Order OTN container that the signal was mapped to, and one or more of the time slots that the signal was mapped to.

Figure 1:
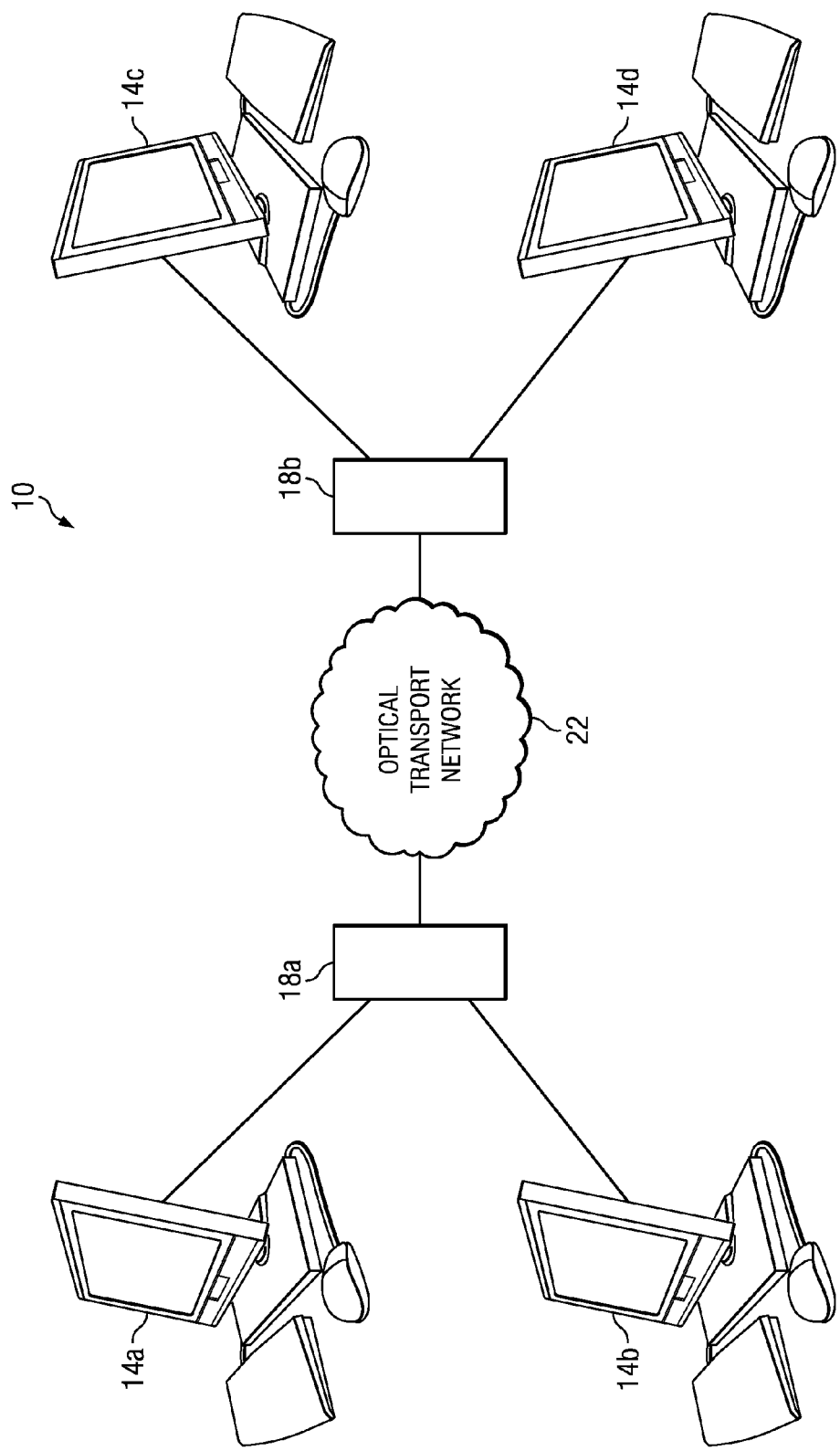
FIG. 1 illustrates an example system for multiplexing in an OTN.

FIG. 1 illustrates an example system 10 for multiplexing in an OTN. Herein, in particular embodiments, reference to OTN encompasses one or more portions of one or more networks that include Reamplification, Reshaping and Retiming (3R) elements connected by optical fibre links and provide transport, multiplexing, switching, management, supervision and survivability functionality for optical channels carrying client signals, as defined by Recommendation G.709 of the Telecommunication Standardization Sector (ITU-T) of the International Telecommunication Union (ITU). System 10 includes one or more clients 14, one or more platforms 18, and OTN 22. A client 14 may send or receive signals over OTN 22. As an example and not by way of limitation, a client 14 may include a desktop computer system, a laptop or notebook computer system, an interactive kiosk, a mainframe, a mesh of computer systems, a mobile telephone, a personal digital assistant (PDA), a server, or a combination of two or more of these, or any other device for sending or receiving signals over OTN 22. A client 14 may send or receive any suitable signal over OTN 22. As an example and not by way of limitation, a signal may include a video signal, an audio signal, any other data signal, or any other suitable signal that may be sent and received over OTN 22. A signal may include an Ethernet signal. A signal may include one or more containers, datagrams, packets, frames, or other discrete units of data for transmission through a packet-switched or other data network. Herein, reference to a signal may encompass one or more containers, datagrams, packets, or frames, and vice versa, where appropriate. In particular embodiments, a signal has one or more protocol types. This disclosure contemplates any suitable protocol types. As an example and not by way of limitation, a signal may have one or more of the following protocol types:

Optical Carrier-1/Synchronous Transport Module-1 (OC-1/STM-1)
OC-12/STM-4
OC-48/STM-16
Level 1 Optical Transport Unit (OTU1)
FE (Fast Ethernet)
Gigabit Ethernet (GbE)
1 Gigabit Fibre Channel (1G FC)
2G FC
4G FC
8G FC
ISC-1
ISC-3 (STP)
STP
Enterprise Systems Connection (ESCON)
ETR-CLO
Digital Video Broadcasting-Asynchronous Serial Interface (DVB-ASI)
Serial Digital Interface (SDI)
High Definition-Serial Digital Interface (HD-SDI)
High Definition-3 Gigabit Serial Digital Interface (3G-SDI)
Fibre Distributed Data Interface (FDDI)
Optical T3
Optical E3
Infiniband 2.5G
Infiniband 5G
G-link
DV6000
Common Public Radio Interface (CPRI)

In particular embodiments, the signal may include any other suitable protocol type.

Platforms 18 may each include any suitable device for connecting clients 14 to OTN 22 so that clients 14 may send and receive signals over OTN 22. For example, platforms 18 may each include a desktop computer system, a laptop or notebook computer system, an interactive kiosk, a mainframe, a mesh of computer systems, a server, a combination of two or more of these, or any other suitable device for connecting clients 14 to OTN 22. In particular embodiments, platforms 18 may receive signals from clients 14 prior to the signals being sent over OTN 22. In particular embodiments, platforms 18 may receive the signals from clients 14 through any suitable connection. For example, platforms 18 may receive the signals from clients 14 through a wired connection or a wireless connection. In particular embodiments, platforms 18 may further multiplex the signals received from clients 14 before sending the signals over OTN 22. For example, platforms 18 may perform multiplexing operations, such as wavelength-division multiplexing (WDM), on the signals received from clients 14. In such an example, the signals may be received at one or more ports of platforms 18, and platforms 18 may multiplex the signals before sending them over OTN 22. In another example, the platforms may include one or more muxponder cards that may perform multiplexing operations. In such an example, the signals may be received at one or more ports of the muxponder cards of platforms 18. In particular embodiments, platforms 18 may further demultiplex any wavelengths received from OTN 22. As such, platforms 18 (or the muxponder cards in platforms 18) may break up the received wavelength into multiple signals for communication to clients 14. In particular embodiments, any multiplexing and demultiplexing performed by platforms 18 may be implemented according to ITU-T Recommendations G.707, G.709, and G.783, which are incorporated herein by reference.

OTN 22 may include any suitable optical network for communicating signals. In particular embodiments, OTN 22 may include one or more optical fibres capable of transmitting optical signals having multiple wavelengths. In particular embodiments, OTN 22 may include one or more amplifiers or one or more Reamplification, Reshaping and Retiming (3R) regeneration points throughout the optical fibres in order to facilitate the communication of signals. In particular embodiments, OTN 22 may utilize wavelength division multiplexing (WDM), in which a number of optical channels are carried over a common path by modulating the channels by wavelength. In particular embodiments, OTN 22 may utilize any other suitable multiplexing operation.

Figure 2:
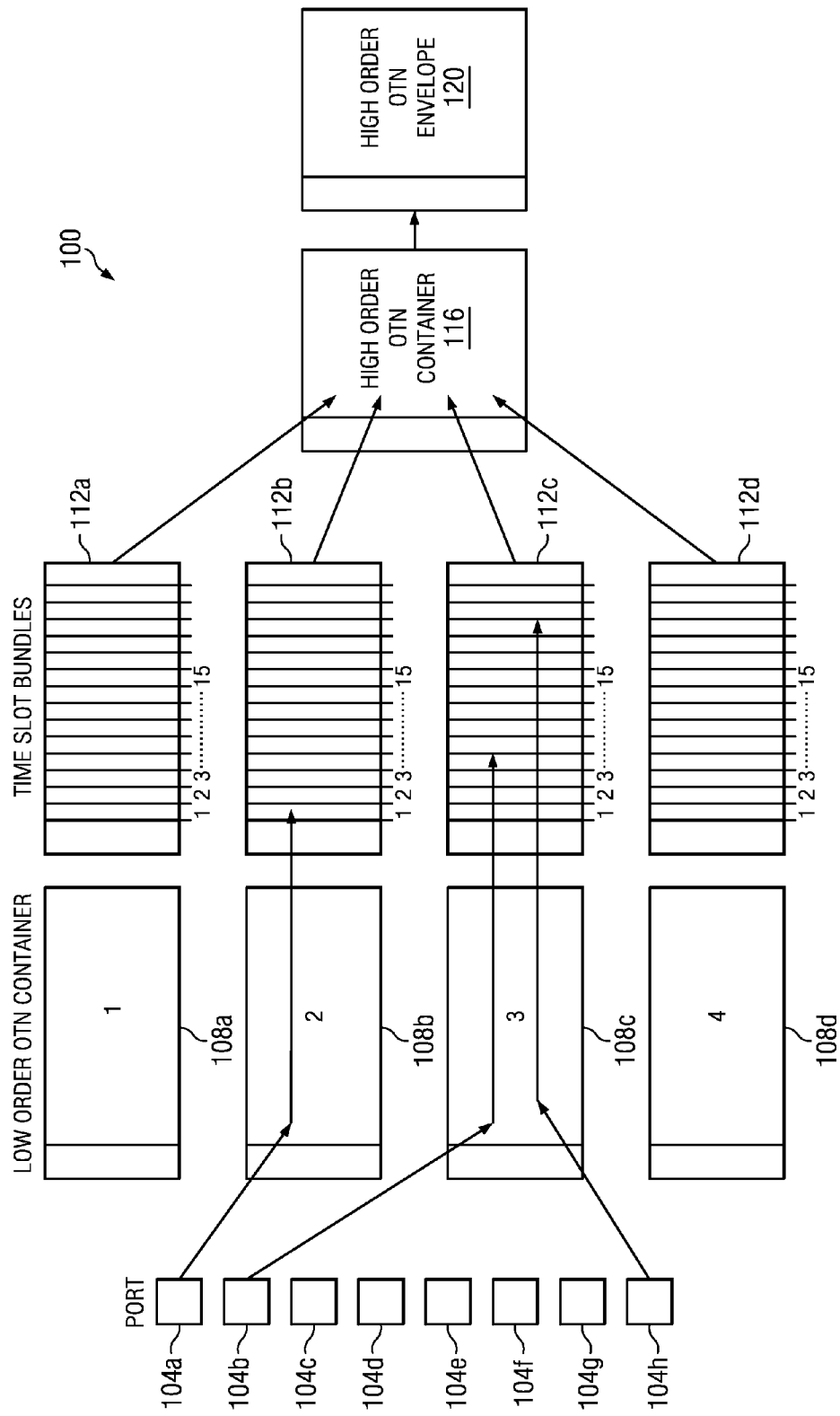
FIG. 2 illustrates example multiplexing in an OTN.

FIG. 2 illustrates example multiplexing 100 in an OTN. In particular embodiments, multiplexing 100 may include a High Order OTN envelope 120 that may store identifying information corresponding to the signal mapped to High Order OTN envelope 120. As such, in particular embodiments, the identifying information may be accessed when the High Order OTN envelope is inspected. Accordingly, the signals may be distinguished from each other without terminating and demapping any Low Order OTN containers 108 mapped to the High Order OTN envelope.

In particular embodiments, multiplexing 100 may include ports 104, Low Order OTN containers 108, time slot bundles 112, a High Order OTN container 116, and High Order OTN envelope 120. Multiplexing 100 may utilize any suitable operation for multiplexing signals for communication over an optical transport network. For example, multiplexing 100 may utilize WDM. As another example, multiplexing 100 may utilize dense wavelength-division multiplexing (DWDM). In a further example, multiplexing 100 may utilize coarse wavelength-division multiplexing (CWDM).

Ports 104 may include any suitable device for receiving signals to be communicated over an optical transport network. For example, ports 104 may include a small form-factor pluggable (SFP), an optical SFP, an electrical SFP, a SFP+, a 10 Gigabit small form factor pluggable (XFP), or any other suitable device for receiving signals to be communicated over an optical transport network. In particular embodiments, ports 104 may receive signals from clients 14 of FIG. 1 for communication over OTN 22 of FIG. 1. In particular embodiments, each port 104 may receive signals from only one client 14. In particular embodiments, each port 104 may receive signals from more than one client 14. In particular embodiments, more than one port 104 may receive signals from only one client 14. Ports 104 may receive the signals from clients 14 over any suitable connection. For example, ports 104 may receive the signals from clients 14 over a wired connection. As another example, ports 104 may receive the signals from clients 14 over a wireless connection. In particular embodiments, ports 104 may further receive signals from OTN 22 to be communicated to clients 14.

In particular embodiments, ports 104 may be components of any suitable device. For example, ports 104 may be components of one or more of platforms 18 of FIG. 1. As another example, ports 104 may be components of one or more muxponder cards. For example, ports 104 may be components of a muxponder card installed in or on the platform 18. In particular embodiments, ports 104 may be components of any other suitable device. In particular embodiments, ports 104 may be components of a single device. For example, ports 104 may be components of a single muxponder card. In particular embodiments, ports 104 may be components of multiple devices. For example, one or more of ports 104 may be components of a first muxponder card, and one or more of the remaining ports 104 may be components of any other suitable number of muxponder cards.

Although FIG. 2 illustrates eight ports 104 (e.g., port 104a, port 104b, port 104c, port 104d, port 104e, port 104f, port 104g, and port 104h), particular embodiments of multiplexing 100 may include any suitable number of ports 104. For example, multiplexing 100 may include less than eight ports 104, or more than eight ports 104. In particular embodiments, multiplexing 100 may include fourteen ports 104. In particular embodiments, multiplexing 100 may include 255 ports 104.

Low Order OTN containers 108 may include any suitable containers for the signals received at ports 104. For example, Low Order OTN containers 108 may include containers that a signal received at the port 104 may be mapped to. In particular embodiments, Low Order OTN containers 108 may be communicated over an optical transport network, as is described in ITU-T Recommendation G.709. For example, Low Order OTN containers 108 may be Level 1 Optical Data Units (ODU1s). In such an example, Low Order OTN containers 108 may include 2.5 Gigabits. In another example, Low Order OTN containers 108 may include Level 2 Optical Data Units (ODU2s). In such an example, Low Order OTN containers 108 may include 10 Gigabits. In a further example, Low Order OTN containers 108 may include Level 3 Optical Data Units (ODU3s). In such an example, Low Order OTN containers 108 may include 40 Gigabits.

In particular embodiments, the signals received at ports 104 may be mapped to Low Order OTN containers 108. In particular embodiments, a signal received at a port 104 may be mapped to any of Low Order OTN containers 108. For example, a signal received at the port 104a may be mapped to Low Order OTN container 108*b*. In another example, a signal received at the port 104*b* may be mapped to Low Order OTN container 108*c*, and a signal received at the port 104*h* may be mapped to Low Order OTN container 108*c* also.

Although FIG. 2 illustrates four Low Order OTN containers 108 (e.g., Low Order OTN container 108*a*, Low Order OTN container 108*b*, Low Order OTN container 108*c*, and Low Order OTN container 108*d*), particular embodiments of multiplexing 100 may include any suitable number of Low Order OTN containers 108. For example, multiplexing 100 may include more than four Low Order OTN containers 108, or less than four Low Order OTN containers 108. In particular embodiments, although multiplexing 100 illustrates the signals being mapped to Low Order OTN container 108, the signals may be first mapped to an optical channel payload unit (OPU) (not shown) before being mapped to Low Order OTN container 108.

The time slot bundles 112 may refer to any suitable collection of time slots. For example, the time slot bundles 112 may refer to a collection of time slots included in Low Order OTN containers 108. In particular embodiments, the time slot bundles 112 may refer to a collection of one or more time slots. For example, in the illustrated embodiment, each of the time slot bundles 112 may refer to a collection of sixteen time slots. In particular embodiments, each of the time slot bundles 112 may refer to a collection of time slots in a particular Low Order OTN container 108. For example, the time slots in the time slot bundle 112*b* may refer to the time slots in Low Order OTN container 108*b*. The time slots of the time slot bundles 112 may include any suitable storage area in Low Order OTN containers 108. For example, a signal received by a port 104 may be mapped to one or more time slots in a time slot bundle 112 of a Low Order OTN container 108. In such an example, a first signal may be mapped to time slots 1 through 4 in a time slot bundle 112 of a Low Order OTN container 108, and a second signal may be mapped to time slots 5 through 16 in the time slot bundle 112 of Low Order OTN container 108. A signal may be mapped to any suitable number of time slots of a time slot bundle 112. For example, a signal may be mapped to one time slot, four time slots, sixteen time slots, or any other suitable number of time slots. Although the illustrated embodiment illustrates each time slot bundle 112 as including sixteen time slots, in particular embodiments, the time slot bundles 112 may include any suitable number of time slots, such as more than sixteen time slots or less than sixteen time slots.

High Order OTN container 116 may include any suitable container for Low Order OTN containers 108. For example, High Order OTN container 116 may include any container that Low Order OTN containers 108 may be mapped to. In particular embodiments, the High Order OTN containers 116 may be communicated over an optical transport network, as is described in ITU-T Recommendation G.709. For example, High Order OTN container 116 may be an ODU. In particular embodiments, High Order OTN container 116 may include any suitable container with a level that is higher than Low Order OTN containers 108. For example, in particular embodiments where Low Order OTN containers 108 may be ODU1s, High Order OTN container 116 may be an ODU2. In such an example, High Order OTN container 116 may include 10 Gigabits. As such, four of Low Order OTN containers 108 may be mapped into High Order OTN container 116 (e.g., four 2.5 Gigabit containers may be mapped to a 10 Gigabit container). As another example, in particular embodiments where Low Order OTN containers 108 may be ODU2s, High Order OTN container 116 may be an ODU3. In such an example, High Order OTN container 116 may include 40 Gigabits. As such, four of Low Order OTN containers 108 may be mapped to High Order OTN container 116 (e.g., four 10 Gigabit containers may be mapped to a 40 Gigabit container). As a further example, in particular embodiments where Low Order OTN containers 108 may be ODU3s, High Order OTN container 116 may be an ODU4. In such an example, High Order OTN container 116 may include 100 Gigabits.

In particular embodiments, by mapping a Low Order OTN container 108 to a High Order OTN container 116, the signal(s) mapped to Low Order OTN container 108 may also mapped to High Order OTN container 116. In particular embodiments, more than one of Low Order OTN containers 108 may be mapped to a single High Order OTN container 116. For example, four Low Order OTN containers 108 may be mapped to a single High Order OTN container 116. In such an example, all the signals that are mapped to each of four Low Order OTN containers 108 are also mapped to High Order OTN container 116.

High Order OTN envelope 120 may include any suitable envelope for High Order container 116. For example, High Order OTN envelope 120 may include any envelope that High Order OTN container 116 may be mapped to. In particular embodiments, High Order OTN envelope 120 may be communicated over an optical transport network, as is described in ITU-T Recommendation G.709. For example, High Order OTN envelope 120 may be an optical transport unit (OTU). In such an example, High Order OTN envelope 120 may condition High Order OTN container 116 for communication over an optical transport network. In particular embodiments, High Order OTN envelope 120 may be any suitable envelope with a level that is the same as, or higher than, High Order OTN container 116. For example, in particular embodiments where High Order OTN container 116 is an ODU2, the High Order OTN envelope may be an OTU2. In such an example, High Order OTN envelope 120 may have a line rate of approximately 10.7 Gigabits per second (Gbps) for communication over an optical transport network. As a further example, in particular embodiments where High Order OTN container 116 is an ODU3, High Order OTN envelope 120 may be an OTU3. In such an example, High Order OTN envelope 120 may have a line rate of approximately 43 Gbps for communication over an optical transport network. As another example, in particular embodiments where High Order OTN container 116 is an ODU4, High Order OTN envelope 120 may be OTU4. In such an example, High Order OTN envelope 120 may have a line rate of approximately 100 Gbps for communication over an optical transport network.

In particular embodiments, by mapping a High Order OTN container 116 to a High Order OTN envelope 120, the signal(s) mapped to High Order OTN container 116 may also mapped to High Order OTN envelope 120. In such an embodiment, all the signals that are mapped to each of four Low Order OTN containers 108 (which are mapped to High Order OTN container 116, as described above) are also mapped to High Order OTN envelope 120. Accordingly, in particular embodiments, High Order OTN envelope 120 may have various signals mapped to it, and one or more of the signals may have a different protocol type, as described above.

Figure 3:
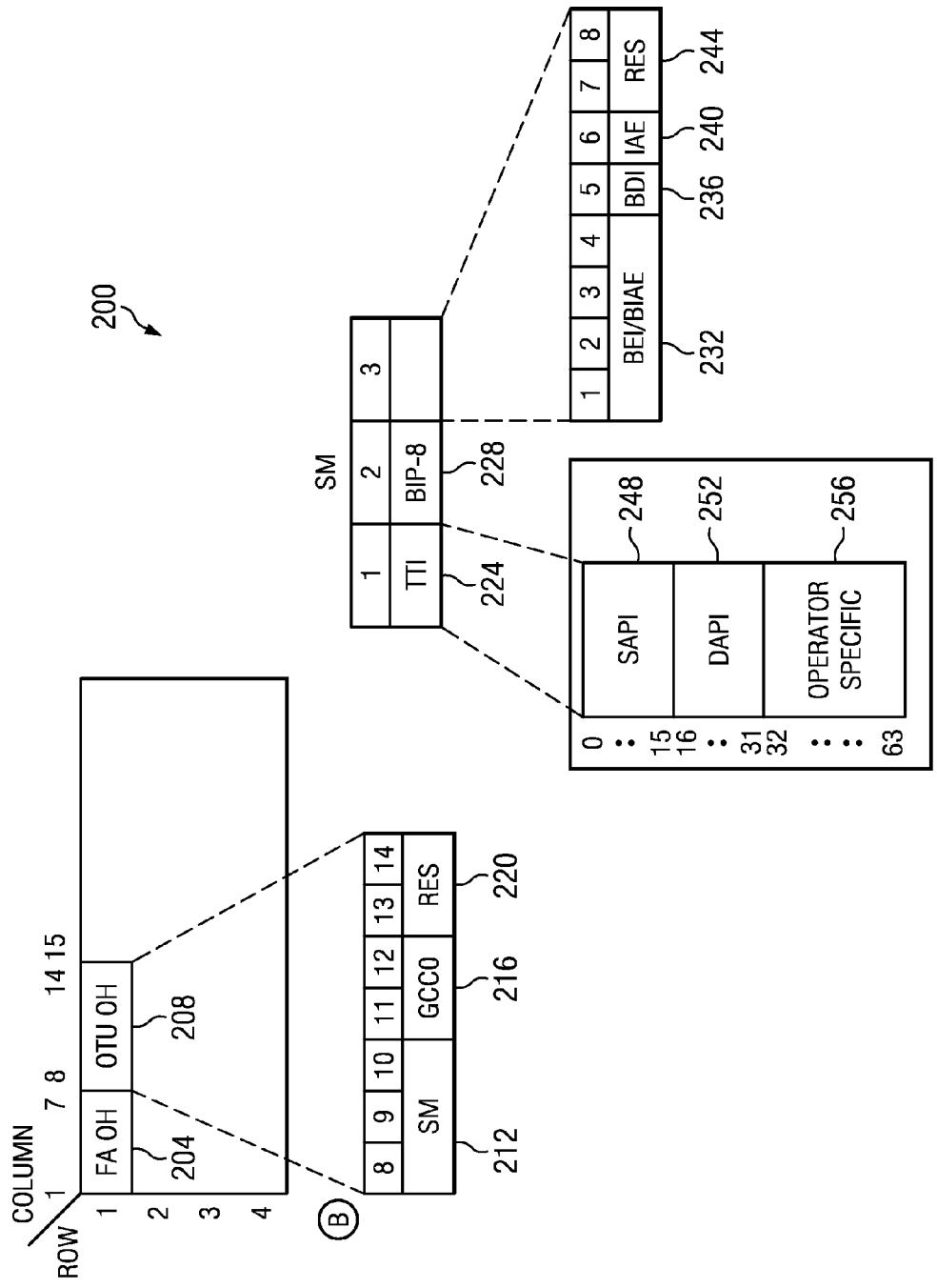
FIG. 3 illustrates an example High Order OTN envelope.

In particular embodiments, High Order OTN envelope 120 may further include identifying information corresponding to the mapped signals. For example, High Order OTN envelope 120 may store identifying information that may correspond to each signal that is mapped to High Order OTN envelope 120. By including identifying information corresponding to the signals mapped to High Order OTN envelope 120, the identifying information may be accessed without having to terminate and demap Low Order OTN containers 108 mapped to High Order OTN container 116 and High Order OTN envelope 120. FIGS. 3-4 illustrate example storage of identifying information in High Order OTN envelope 120.

FIG. 3 illustrates an example High Order OTN envelope 200. In particular embodiments, High Order OTN envelope 200 includes an Operator Specific 256 that may store identifying information corresponding to a signal. As such, any identifying information corresponding to the signal may be accessed without having to terminate and demap any Low Order OTN containers mapped to a High Order OTN container and High Order OTN envelope 200.

In particular embodiments, High Order OTN envelope 200 of FIG. 3 is similar to High Order OTN envelope 120 of FIG. 2. In particular embodiments, High Order OTN envelope 200 includes an OTU. For example, the High Order OTN envelope may include an OTU2, OTU3, or OTU4. In particular embodiments, High Order OTN envelope 200 may include any other suitable envelope for communication over an optical transport network.

In particular embodiments, High Order OTN envelope 200 includes framing (FA OH) 204, OTU overhead (OTU OH) 208, Section Monitoring (SM) 212, General Communication Channel 0 (GCC0) 216, Reserve (RES) bytes 220, Trail Trace Identifier (TTI) 224, Bit Interleaved Parity-level 8 (BIP-8) 228, Backward Error Indication (BEI)/Backward Incoming Alignment Error (BIAE) 232, Backward Defect Indication (BDI) 236, Incoming Alignment Error (IAE) 240, Reserve (RES) bytes 244, Source Access Point Identifier (SAPI) 248, Designation Access Point Identifier (DAPI) 252, and Operator Specific 256. Each of these elements may be standard elements of an OTU, and are further described in ITU-T Recommendation G.709, which is incorporated herein by reference.

In particular embodiments, the OTU OH 208 includes SM 212, as is illustrated. Furthermore, SM 212 includes TTI 224, which includes Operator Specific 256. In particular embodiments, Operator Specific 256 may include thirty-two bytes (e.g., bytes 32 through 63 of TTI 224). In particular embodiments, the thirty-two bytes of Operator Specific 256 may store identifying information corresponding to the signal mapped to High Order OTN envelope 200. For example, Operator Specific 256 may store any identifying information that is inserted into High Order OTN envelope 200. In such an example, the identifying information may be inserted into High Order OTN envelope 200 when a High Order OTN container is mapped to High Order OTN envelope 200. Furthermore, the identifying information may be inserted by any suitable device, such as platforms 18 of FIG. 1, or one or more muxponder cards in platforms 18.

In particular embodiments, the bytes of Operator Specific 256 may store any suitable information corresponding to a signal. For example, the identifying information corresponding to the signal may identify the port that the signal was received at, the protocol type of the signal, the Low Order OTN container that the signal was mapped to, or the time slots that the signal was mapped to in the Low Order OTN container. In particular embodiments, any other suitable information corresponding to the signal may be stored in the bytes of Operator Specific 256. In particular embodiments where the identifying information includes the identity of the port that the signal was received at, the identifying information may explicitly identify the port that the signal was received at, or may implicitly identify the port that the signal was received at, as FIGS. 4A-4C illustrate.

In particular embodiments, storing the identifying information may include storing Port and Protocol Mapping Identifiers (PPMI) corresponding to the identifying information. In particular embodiments, storing the identifying information may include storing any other suitable type of data type corresponding to the identifying information.

In particular embodiments, by storing the identifying information in Operator Specific 256, the identifying information may be accessed without having to terminate and demap any Low Order OTN containers mapped to a High Order OTN container and High Order OTN envelope 200. For example, Operator Specific 256 is included in TTI 224. As such, TTI 224 (including Operator Specific 256) may be inspected during its communication through the optical transport network in order to avoid Trail Trace mismatch. Accordingly, the identifying information may be inspected while the rest of TTI 224 is inspected also. Therefore, the identifying information may be inspected without terminating and demapping any Low Order OTN containers. In particular embodiments, the identifying information may be inspected by a 3R regeneration point on the optical transport network.

Although FIG. 3 illustrates the identifying information as being stored in the bytes of Operator Specific 256 of the High Order OTN envelope 220, in particular embodiments, the identifying information may be stored in the Path Monitoring-Trail Trace Identifier (PM-TTI) of a High Order OTN container, or the Tandem Connection Monitoring-Trail Trace Identifier (TCMx-TTI) of a High Order OTN container.

FIGS. 4A-C illustrate example multiplexing tagging. In particular embodiments, FIG. 4A includes Operator Specific 300. In particular embodiments, Operator Specific 300 of FIG. 4A may be similar to Operator Specific 256 of FIG. 3. As such, Operator Specific 300 may store identifying information corresponding to a signal mapped to a High Order OTN envelope. In particular embodiments, the identifying information may include the identity of the port where a signal was received at. In particular embodiments, by storing the actual port identity in the bytes of Operator Specific 300, Operator Specific 300 may explicitly identify the port where the signal was received.

In particular embodiments, Operator Specific 300 includes port number section 304, protocol type section 308, ODU number section 312, and time slot section 316. In particular embodiments, port number section 304 may include identifying information regarding what port a signal was received at. For example, in particular embodiments where a signal was received at a particular port, such as the first port, port number section 304 may include identifying information that actually identifies the first port. In particular embodiments, actually identifying a port may refer to storing any identifying information about the port in the bytes of Operator Specific 300. By storing the identifying information about the port in Operator Specific 300, the port may be explicitly identified when Operator Specific 300 is inspected. In particular embodiments, explicitly identifying the port is different from implicitly identifying the port, as FIG. 4C illustrates.

Protocol type section 308 may include identifying information regarding the protocol type of the signal mapped to the High Order OTN envelope. For example in particular embodiments where a 1 GbE signal is mapped to the High Order OTN envelope, protocol type section 308 may include identifying information that identifies the signal as a 1 GbE signal. ODU number section 312 may include identifying information regarding the Low Order OTN container that the signal was mapped to. For example, in particular embodiments where a signal was mapped to a particular Low Order OTN container, such as the second Low Order OTN container, ODU number section 312 may include identifying information that identifies the second Low Order OTN container. Time slot section 316 may include identifying information regarding the time slots that the signal was mapped to. For example, in particular embodiments where a signal was mapped to particular time slots of a Low Order OTN container, such as time slots 4 through 8, time slot section 316 may include identifying information that identifies the first time slot that the signal is mapped to (e.g., time slot 4). In another example, time slot section 316 may include identifying information that identifies any of the time slots that the signal is mapped to. In such an example, where the signal was mapped to time slots 4 through 8, time slot section 316 may include identifying information that identifies the time slot 4, the time slot 5, the time slot 6, the time slot 7, or the time slot 8.

In particular embodiments, by storing identifying information regarding what port a signal was received at, the protocol type of the signal, the Low Order OTN container that the signal was mapped to, and the time slots that the signal was mapped to, all this identifying information may be accessed any time Operator Specific 300 is inspected. As such, in particular embodiments, this identifying information may be accessed without having to terminate and demap the Low Order OTN containers.

In particular embodiments, the identifying information stored in Operator Specific 300 may be stored in a particular configuration. For example, port number section 304 may include a portion of one byte of Operator Specific 300, protocol type section 308 may include one byte of Operator Specific 300, ODU number section 312 may include a portion of one byte of Operator Specific 300, and time slot section 316 may include a portion of one byte of Operator Specific 300. Accordingly, the identifying information stored in Operator Specific 300 for each signal may use four bytes of the thirty-two bytes in Operator Specific 300. As such, in particular embodiments, Operator Specific 300 may store identifying information for eight different signals mapped to the High Order OTN envelope.

Although FIG. 4A illustrates Operator Specific 300 as explicitly identifying the port where the signal was received, in particular embodiments, a PM-TTI of a High Order OTN container or a TCMx-TTI of a High Order OTN container may explicitly indentify the port where the signal was received.

FIG. 4B illustrates example explicit identification of a port where a signal was received. In particular embodiments, FIG. 4B includes Operator Specific 400. In particular embodiments, Operator Specific 400 of FIG. 4B may be similar to Operator Specific 300 of FIG. 4A. As such, Operator Specific 400 may explicitly identify the port where a signal was received.

In particular embodiments, Operator Specific 400 includes port number section 404, ODU number section 408, time slot section 412, and protocol type section 416. In particular embodiments, port number section 404 of FIG. 4B may be similar to port number section 304 of FIG. 4A, ODU number section 408 of FIG. 4B may be similar to ODU number section 312 of FIG. 4A, time slot section 412 of FIG. 4B may be similar to time slot section 316 of FIG. 4A, and protocol type section 416 of FIG. 4B may be similar to protocol type section 308 of FIG. 4A.

In particular embodiments, the identifying information stored in Operator Specific 400 of FIG. 4B may be stored in a different configuration than the identifying information that is stored in Operator Specific 300 of FIG. 4A. For example, port number section 404 may include a portion of one byte of Operator Specific 400, ODU number section 408 may include a portion of one byte of Operator Specific 400, time slot section 412 may include a portion of one byte of Operator Specific 400, and the protocol type section 416 may include a portion of one byte of Operator Specific 400. Accordingly, the identifying information stored in Operator Specific 400 for each signal may use two bytes of the thirty-two bytes in Operator Specific 400. As such, in particular embodiments, Operator Specific 400 may store identifying information for sixteen different signals mapped to the High Order OTN envelope.

Although FIG. 4B illustrates Operator Specific 400 as explicitly identifying the port where the signal was received, in particular embodiments, a PM-TTI of a High Order OTN container or a TCMx-TTI of a High Order OTN container may explicitly indentify the port where the signal was received.

As described above, FIGS. 4A and 4B illustrate the Operator Specific as storing identifying information in particular configurations. In particular embodiments, any other suitable configuration for storing identifying information may be used. For example, more identifying information may be stored, less identifying information may be stored, or different identifying information may be stored. As another example, the identifying information may only include the identity of the port where the signal was received. In such an example, the Operator Specific may store identifying information for signals received from 255 different ports.

FIG. 4C illustrates example implicit identification of a port where a signal was received. In particular embodiments, FIG. 4C includes Operator Specific 500. In particular embodiments, Operator Specific 500 of FIG. 4C may be similar to Operator Specific 400 of FIG. 4B. As such, Operator Specific 500 may store identifying information corresponding to a signal mapped to a High Order OTN envelope. In particular embodiments, by storing the identifying information corresponding to a signal in particular bytes of Operator Specific 500, Operator Specific 500 may implicitly identify the port where the signal was received.

In particular embodiments, Operator Specific 500 includes time slot section 504, protocol type section 508, and ODU number section 512. In particular embodiments, time slot section 504 of FIG. 4C may be similar to time slot section 412 of FIG. 4B, protocol type section 508 of FIG. 4C may be similar to the protocol type section 416 of FIG. 4B, and ODU number section 512 of FIG. 4C may be similar to ODU number section 408 of FIG. 4B.

In particular embodiments, the identifying information stored in Operator Specific 500 may not explicitly include the actual identity of the port where the signal was received. Instead, in particular embodiments, Operator Specific 500 may include bytes that are associated with particular ports. For example, bytes 32 and 33 of Operator Specific 500 may be associated with port 0, bytes 34 and 35 of Operator Specific 500 may be associated with port 1, and bytes 62 and 63 of Operator Specific 500 may be associated with port 15. Accordingly, in particular embodiments where a signal is received at port 1, the identifying information for the signal may be stored in bytes 32 and 33 in order to identify the signal as having been received at port 1.

In particular embodiments, such a storage configuration in Operator Specific 500 may allow access to identifying information regarding the time slots that the signal was mapped to, the protocol type of the signal, and the Low Order OTN container that the signal was mapped to. Furthermore, the storage of the identifying information in particular bytes may also allow the port where the signal was received to be implicitly identified. As such, the port may be identified based on where the identifying information is located in Operator Specific 500.

In particular embodiments, the identifying information stored in Operator Specific 500 may be stored in a different configuration than the identifying information that is stored in Operator Specific 300 of FIG. 4A. For example, time slot section 504 may include a portion of one byte of Operator Specific 500, protocol type section 508 may include a portion of one byte of Operator Specific 500, and ODU number section 512 may include a portion of one byte of Operator Specific 500. Accordingly, the identifying information stored in Operator Specific 500 for each signal may use two bytes of the thirty-two bytes in Operator Specific 500. As such, in particular embodiments, Operator Specific 500 may store identifying information for sixteen different signals mapped to the High Order OTN envelope. Furthermore, Operator Specific 500 may implicitly identify fifteen different ports. In particular embodiments, port 0 is a first client port.

As described above, FIG. 4C illustrates Operator Specific 500 as storing identifying information in particular configurations. In particular embodiments, any other suitable configuration for storing identifying information may be used. For example, more identifying information may be stored, less identifying information may be stored, or different identifying information may be stored.

Although FIG. 4C illustrates Operator Specific 500 as implicitly identifying the port where the signal was received, in particular embodiments, a PM-TTI of a High Order OTN container or a TCMx-TTI of a High Order OTN container may implicitly identify the port where the signal was received.

Figure 5:
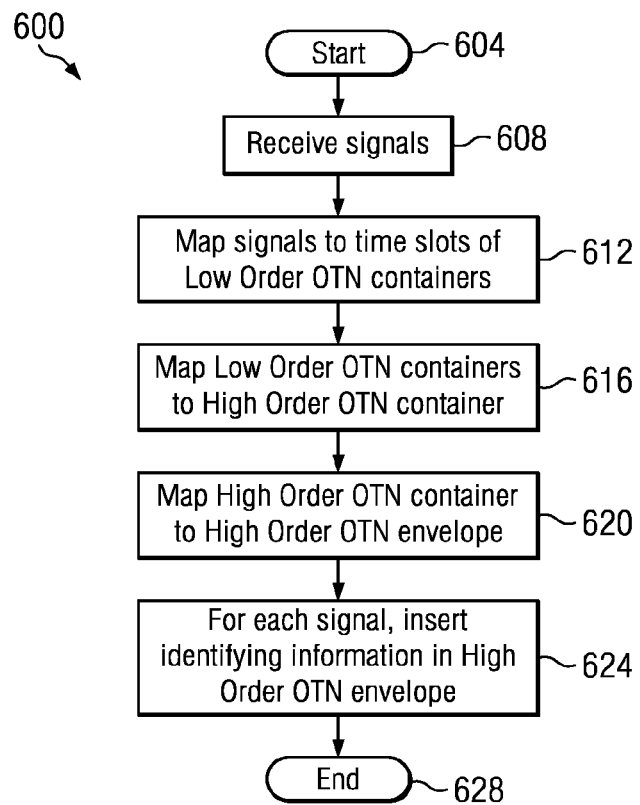
FIG. 5 illustrates an example method for multiplexing in an OTN.

FIG. 5 illustrates an example method 600 for multiplexing in an OTN. The method starts at step 604. At step 608, signals are received. In particular embodiments, a plurality of signals are received at a plurality of ports. In particular embodiments, the ports may be included on any particular device, such as a muxponder card. In particular embodiments, one or more of the ports may each be an SFP port. In particular embodiments, each of the signals may have a protocol type. For example, the protocol type may be a Gigabit Ethernet, a 1 Gigabit Fibre Channel, or a 2 Gigabit Fibre Channel.

At step 612, the signals are mapped to time slots of Low Order OTN containers. In particular embodiments, the signals may be mapped to one or more time slots of one of a plurality of Low Order OTN containers. In particular embodiments, the Low Order OTN container may be an ODU1, an ODU2, or an ODU3. At step 616, the Low Order OTN containers are mapped to High Order OTN containers. In particular embodiments, the High Order OTN container is an ODU of a higher level than the Low Order OTN container. In particular embodiments, four Low Order OTN containers may be mapped to the High Order OTN container. At step 620, the High Order OTN container is mapped to a High Order OTN envelope. In particular embodiments, the High Order OTN is mapped to the High Order OTN envelope for communication over an optical transport network. In particular embodiments, the High Order OTN envelope is an OTU of the same or higher level as the High Order OTN container.

At step 624, for each signal, information is inserted into the High Order OTN envelope. In particular embodiments, the information may identify the port that the signal was received at, the protocol type of the signal, the Low Order OTN container that the signal was mapped to, and one or more of the time slots that the signal was mapped to. In particular embodiments, the information in the High Order OTN envelope may implicitly identify the port that the signal was received at. In particular embodiments, the information in the High Order OTN envelope may explicitly identify the port that the signal was received at. In particular embodiments, the information in the High Order OTN envelope may identify a first one of the time slots that the frame was mapped to. At step 628, the method ends. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates particular components carrying out particular steps of the method of FIG. 5, this disclosure contemplates any suitable combination of any suitable components carrying out any suitable steps of the method of FIG. 5.

Figure 6:
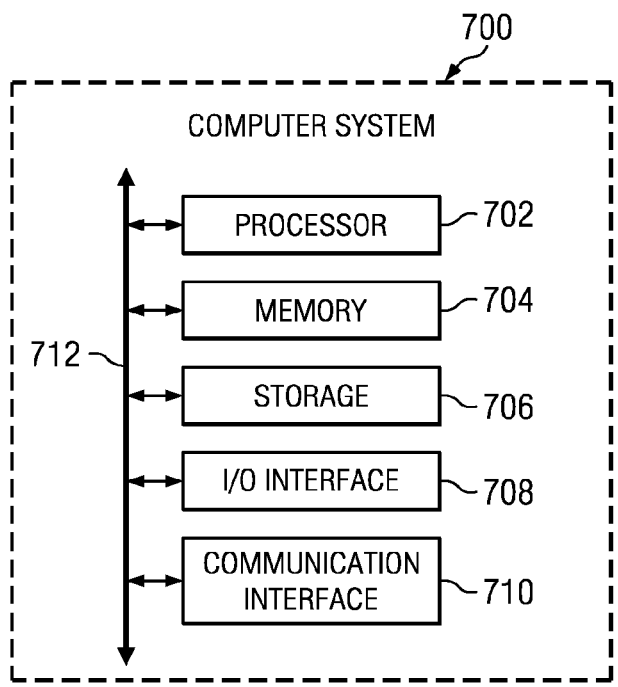
FIG. 6 illustrates an example computer system.

FIG. 6 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 700 may include one or more computer systems 700; be unitary or distributed; span multiple locations; span multiple machines; span multiple datacenters; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include an HDD, a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 75 U.S.C. §101. Herein, reference to a computer-readable storage medium excludes transitory forms of signal transmission (such as a propagating electrical or electromagnetic signal per se) to the extent that they are not eligible for patent protection under 75 U.S.C. §101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 702 (such as, for example, one or more internal registers or caches), one or more portions of memory 704, one or more portions of storage 706, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in HyperText Markup Language (HTML), Extensible Markup Language (XML), or other suitable markup language.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising, by one or more computer systems:
   receiving a plurality of signals at a plurality of ports, each of the plurality of signals having a protocol type;
   mapping each of the plurality of signals to one or more time slots of one of a plurality of Low Order Optical Transport Network (OTN) containers;
   mapping the Low Order OTN containers to a High Order OTN container;
   mapping the High Order OTN container to a High Order OTN envelope for communication over an OTN; and
   in connection with the mapping of the High Order OTN container to the High Order OTN envelope, for each of the plurality of signals, inserting into the High Order OTN envelope information identifying:
     which of the plurality of ports that the respective signal was received at;
     the protocol type of the respective signal;
     the Low Order OTN container that the respective signal was mapped to; and
     one or more of the time slots that the respective signal was mapped to.

2. The method of claim 1, wherein the protocol type of one or more of the plurality of signals is Gigabit Ethernet (GbE), 1 Gigabit Fibre Channel, or 2 Gigabit Fibre Channel.

3. The method of claim 1, wherein, for each of the signals, information in the High Order OTN envelope implicitly identifies which of the plurality of ports that the respective signal was received at.

4. The method of claim 1, wherein, for each of the signals, information in the High Order OTN envelope explicitly identifies the port that the respective signal was received at.

5. The method of claim 1, wherein, for each of the signals, information in the High Order OTN envelope identifies a first one of the time slots that the respective signal was mapped to.

6. The method of claim 1, wherein:
the respective Low Order OTN container is a Level 1 Optical Data Unit (ODU1), a Level 2 Optical Data Unit (ODU2), or a Level 3 Optical Data Unit (ODU3); and
the High Order OTN container is an Optical Data Unit (ODU) of a higher level than the plurality of Low Order containers.

7. The method of claim 6, wherein the High Order OTN envelope is an Optical Transport Unit (OTU) of the same or higher level as the High Order OTN container.

8. The method of claim 1, wherein one or more of the plurality of ports are each an optical small form-factor pluggable (SFP) port.

9. An apparatus, comprising:
a plurality of ports operable to receive a plurality of signals, wherein each of the plurality of signals have a protocol type; and
a memory comprising instructions for execution by one or more processors; and
the one or more processor, operable when executing the instructions to:
map each of the plurality of signals to one or more time slots of one of a plurality of Low Order Optical Transport Network (OTN) containers;
map the Low Order OTN containers to a High Order OTN container;
map the High Order OTN container to a High Order OTN envelope for communication over an OTN; and
in connection with the mapping of the High Order OTN container to the High Order OTN envelope, for each of the plurality of signals, insert into the High Order OTN envelope information identifying:
which of the plurality of ports that the respective signal was received at;
the protocol type of the respective signal;
the Low Order OTN container that the respective signal was mapped to; and
one or more of the time slots that the respective signal was mapped to.

10. The apparatus of claim 9, wherein the protocol type of one or more of the plurality of signals is Gigabit Ethernet (GbE), 1 Gigabit Fibre Channel, or 2 Gigabit Fibre Channel.

11. The apparatus of claim 9, wherein, for each of the signals, information in the High Order OTN envelope implicitly identifies which of the plurality of ports that the respective signal was received at.

12. The apparatus of claim 9, wherein, for each of the signals, information in the High Order OTN envelope explicitly identifies the port that the respective signal was received at.

13. The apparatus of claim 9, wherein, for each of the signals, information in the High Order OTN envelope identifies a first one of the time slots that the respective signal was mapped to.

14. The apparatus of claim 9, wherein:
the respective Low Order OTN container is a Level 1 Optical Data Unit (ODU1), a Level 2 Optical Data Unit (ODU2), or a Level 3 Optical Data Unit (ODU3); and
the High Order OTN container is an Optical Data Unit (ODU) of a higher level than the plurality of Low Order containers.

15. The apparatus of claim 14, wherein the High Order OTN envelope is an Optical Transport Unit (OTU) of the same or higher level as the High Order OTN container.

16. The apparatus of claim 9, wherein one or more of the plurality of ports are each an optical small form-factor pluggable (SFP) port.

17. Logic embodied in one or more computer-readable non-transitory media for execution and when executed operable to:
for a plurality of signals received at a plurality of ports, map each of the plurality of signals to one or more time slots of one of a plurality of Low Order Optical Transport Network (OTN) containers, wherein each of the plurality of signals have a protocol type;
map the Low Order OTN containers to a High Order OTN container;
map the High Order OTN container to a High Order OTN envelope for communication over an OTN; and
in connection with the mapping of the High Order OTN container to the High Order OTN envelope, for each of the plurality of signals, insert into the High Order OTN envelope information identifying:
which of the plurality of ports that the respective signal was received at;
the protocol type of the respective signal;
the Low Order OTN container that the respective signal was mapped to; and
one or more of the time slots that the respective signal was mapped to.

18. The logic of claim 17, wherein the protocol type of one or more of the plurality of signals is Gigabit Ethernet (GbE), 1 Gigabit Fibre Channel, or 2 Gigabit Fibre Channel.

19. The logic of claim 17, wherein, for each of the signals, information in the High Order OTN envelope implicitly identifies which of the plurality of ports that the respective signal was received at.

20. The logic of claim 17, wherein, for each of the signals, information in the High Order OTN envelope explicitly identifies the port that the respective signal was received at.

21. The logic of claim 17, wherein, for each of the signals, information in the High Order OTN envelope identifies a first one of the time slots that the respective signal was mapped to.

22. The logic of claim 17, wherein:
the respective Low Order OTN container is a Level 1 Optical Data Unit (ODU1), a Level 2 Optical Data Unit (ODU2), or a Level 3 Optical Data Unit (ODU3); and
the High Order OTN container is an Optical Data Unit (ODU) of a higher level than the plurality of Low Order containers.

23. The logic of claim 22, wherein the High Order OTN envelope is an Optical Transport Unit (OTU) of the same or higher level as the High Order OTN container.

24. The logic of claim 17, wherein one or more of the plurality of ports are each an optical small form-factor pluggable (SFP) port.

* * * * *